(12) United States Patent
Bermundo et al.

(10) Patent No.: US 12,091,795 B2
(45) Date of Patent: Sep. 17, 2024

(54) TEXTILE PATCH ATTACHMENT

(71) Applicant: KYOCERA Document Solutions Inc., Osaka (JP)

(72) Inventors: Neil-Paul Payoyo Bermundo, Glendora, CA (US); Kunihiko Shimamoto, Torrance, CA (US); Warren Intruzo San Jose, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 118 days.

(21) Appl. No.: 17/902,125

(22) Filed: Sep. 2, 2022

(65) Prior Publication Data

US 2024/0076816 A1    Mar. 7, 2024

(51) Int. Cl.
*D05B 19/02* (2006.01)
*G06T 7/60* (2017.01)
*G06T 7/73* (2017.01)
*G06T 7/90* (2017.01)

(52) U.S. Cl.
CPC ............... *D05B 19/02* (2013.01); *G06T 7/60* (2013.01); *G06T 7/73* (2017.01); *G06T 7/90* (2017.01); *D05D 2205/18* (2013.01); *D05D 2303/20* (2013.01); *D05D 2305/32* (2013.01); *G06T 2207/30124* (2013.01)

(58) Field of Classification Search
CPC ........ D05B 19/02; D05B 19/04; D05B 19/08; D05B 19/10; D05B 19/12; G06T 7/60; G06T 7/73; G06T 7/90
See application file for complete search history.

(56) References Cited

U.S. PATENT DOCUMENTS

2021/0130999 A1* 5/2021 Blenis, Jr. .............. D05B 19/10
2022/0042226 A1* 2/2022 Kvarnstrand .......... G06N 3/048

* cited by examiner

*Primary Examiner* — Nathan E Durham
(74) *Attorney, Agent, or Firm* — W. Eric Webostad

(57) ABSTRACT

Systems and methods relate generally to textile patch attachment to a textile material. In an example, a method relating generally to textile patch attachment to a textile material is disclosed. In such a method, design and coloring of a textile patch and the textile material is detected. This detection includes: capturing images of the textile patch and the textile material with a camera; sending the images to a programmed computer system in communication with the camera for image processing; determining thickness and colors of the textile patch and the textile material from the image processing of the images; and determining position of the textile patch relative to a pattern of the textile material from the image processing of the images. After the detecting, data obtained from the detecting is displayed on a display screen of the programmed computer system.

9 Claims, 7 Drawing Sheets

TEXTILE PATCH ATTACHMENT

FIELD

The following description relates to device automation. More particularly, the following description relates to automation of textile patch attachment to a textile material.

BACKGROUND

A problem in the clothing industry is to produce clothing that have one or more instances of embroidered patches. A problem with embroidery is that embroidering clothing generally means sewing a design onto clothing material during production.

SUMMARY

In accordance with one or more below described examples, a method relating generally to textile patch attachment to a textile material is disclosed. In such a method, design and coloring of a textile patch and the textile material is detected. This detection includes: capturing images of the textile patch and the textile material with a camera; sending the images to a programmed computer system in communication with the camera for image processing; determining thickness and colors of the textile patch and the textile material from the image processing of the images; and determining position of the textile patch relative to a pattern of the textile material from the image processing of the images. After the detecting, data obtained from the detecting is displayed on a display screen of the programmed computer system.

In accordance with one or more below described examples, a system relating generally to textile patch attachment to a textile material is disclosed. In such a system, a programmed computer system has memory, a processor, a display, and is in communication with a camera and a stitching or sewing machine ("sewing machine"). The processor is coupled to the memory, wherein, in response to executing program code, the processor of the programmed computer system is configured to initiate operations for attachment of a textile patch to the textile material. The operations include detecting design and color of the textile patch and the textile material. The detecting includes: capturing images of the textile patch and the textile material with the camera; sending the images to the programmed computer system in communication with the camera for image processing; determining thickness and colors of the textile patch and the textile material from the image processing of the images; and determining position of the textile patch relative to a pattern of the textile material from the image processing of the images. After the detecting, the operations include displaying data obtained from the detecting on the display of the programmed computer system.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a flow diagram depicting an example of an attachment flow.

FIG. 1-3 is a flow diagram depicting the example of the attachment flow of FIG. 1-2 with additional operations.

FIG. 2 is a pictorial-block diagram depicting an example of a stitching or sewing machine ("sewing machine") under control of a programmed computer system.

FIG. 3 is a block diagram depicting an example of an image processing flow.

DETAILED DESCRIPTION

Figure 1:
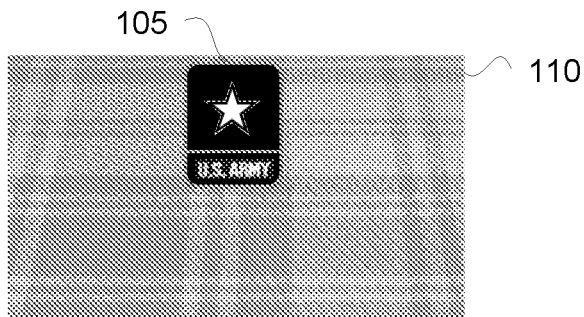
FIG. 1-1 is a pictorial diagram depicting an example of a textile patch and a textile material.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Pre-made patches can be attached to any clothing or any textile material during or after production. Conventionally, patches have been attached by manually ironing or sewing each textile patch to a textile material. While sewing may be a more secure form of attachment than ironing, conventionally a person doing such sewing would laboriously use a sewing machine after arranging and placing a textile patch onto a textile material and then slide each one to another for passing through an actuated threaded needle of such sewing machine. With the above general understanding borne in mind, various configurations for systems, and methods therefor, with automated sewing of textile patches to textile material are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1-1 is a pictorial diagram depicting an example of a textile patch 105 and a textile material 110. In this example, a rectangular US Army patch is illustratively depicted as a textile patch 105; however, this or another patch may be used in other examples. Along those lines, patches of geometric or irregular shapes with different colors and patterns may be used. Furthermore, even though a textile material 110 in this example has a tartan or plaid pattern, in another example a solid color or a different pattern may be used.

Figures 1, 2:
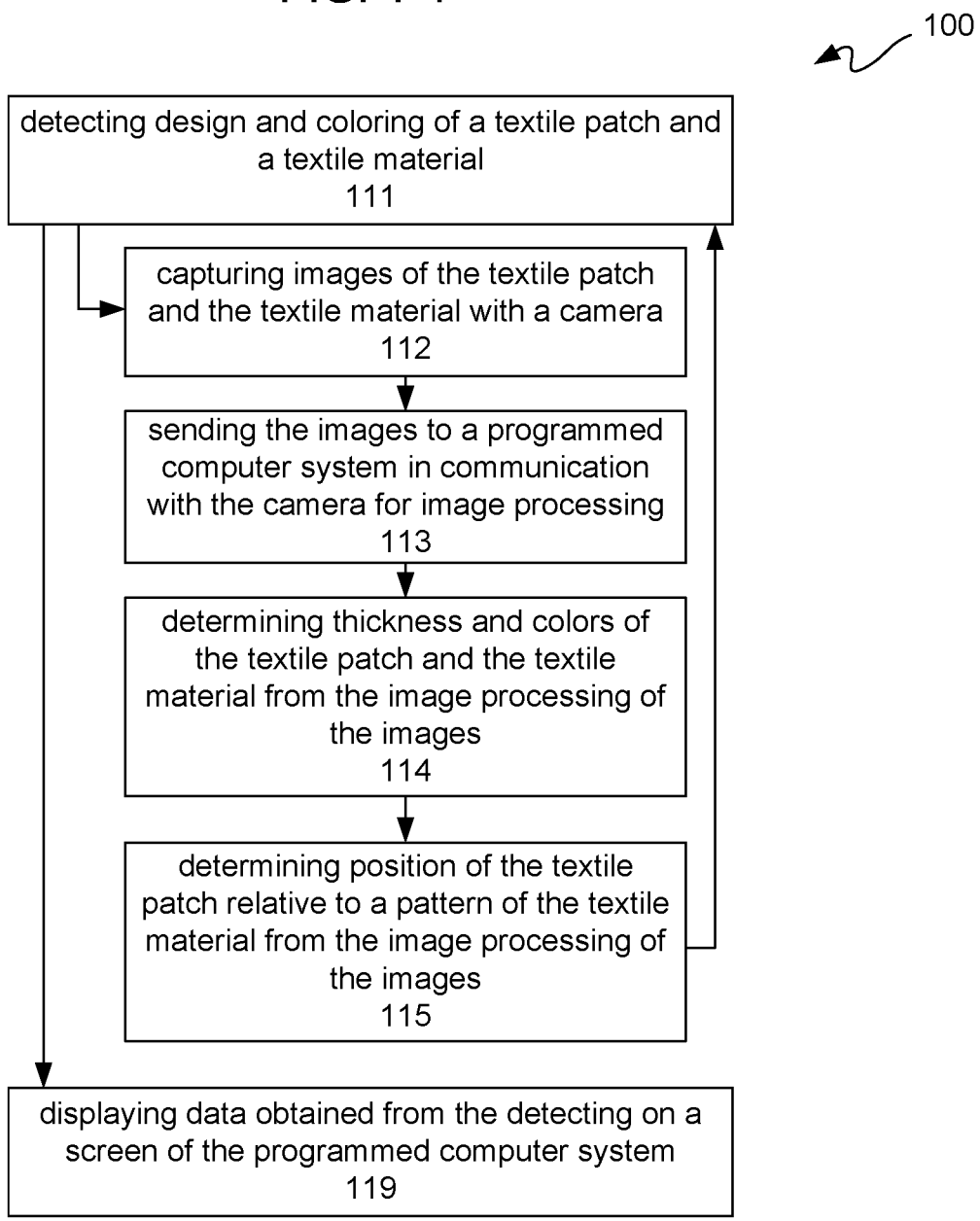

FIG. 1-2 is a flow diagram depicting an example of an attachment flow 100. Attachment flow 100 is further described with simultaneous reference to FIGS. 1-1 and 1-2 for attaching a textile patch, such as for example textile patch 105, to a textile material, such as for example textile material 110.

At operation 111, a design or designs, if any, and coloring, including without limitation black and white, of a textile patch 105 and a textile material 110 may be detected. Such detection at operation 111 may include operations 112 through 115.

FIG. 2 is a pictorial diagram depicting an example of a stitching or sewing machine ("sewing machine") 200 under control of a programmed computer system 210. Programmed computer system 210 may include a display screen ("screen") 204 and a processor, such as a central processing unit or CPU 205 for example. Other details regarding programmed computer system 210 are provided elsewhere herein.

Programmed computer system 210 may be configured to control operation of sewing machine 200. For example, programmed computer system 210 may be configured to control operation of needle 206, moveable-adjustable grips 202, and moveable plate 203. Furthermore, programmed computer system 210 may be in communication with digital camera ("camera") 201. Attachment flow 100 is further described with simultaneous reference to FIGS. 1-1 through 2.

Moveable-adjustable grips 202 may be mechanical, moveable or automated robotic arms that hold onto textile material 110 and patch 105. Grips 202 may be activated responsive to automated sewing or stitching being initiated. Though two grips 202 are illustratively depicted, in another example there can be several grips 202 around moveable plate 203. In this example, one grip 202 may be lifted for needle 206 to go through where such grip is currently positioned while such other grip 202 holds textile material 110 and patch 105 in place.

Moveable plate 203 may be a mechanical plate or platform that can rotate, move side-to-side, up-or-down, and at any angular linear motion to be able to position textile material 110 and patch 105 together during automated sewing. Moveable plate 203 may be activated responsive to automated sewing or stitching being initiated.

At operation 112, images of textile patch 105 and textile material 110 may be captured with a camera 201. At operation 113, such captured images may be sent to a programmed computer system 210 in communication with camera 201.

Programmed computer system 210 may be configured for image processing of such digital images.

At operation 114, one or more thicknesses and one or more colors of textile patch 105 and textile material 110 may be determined from image processing of images thereof by programmed computer system 210 in communication with camera 201. At operation 115, position of textile patch 105 relative to a pattern of textile material 110 may be determined from image processing of images thereof by programmed computer system 210 in communication with camera 201.

At operation 130, data obtained from detecting, such as for example from one or more of operations 112 through 115, may be displayed on a screen 204 of programmed computer system 210.

Figures 1, 2, 3:
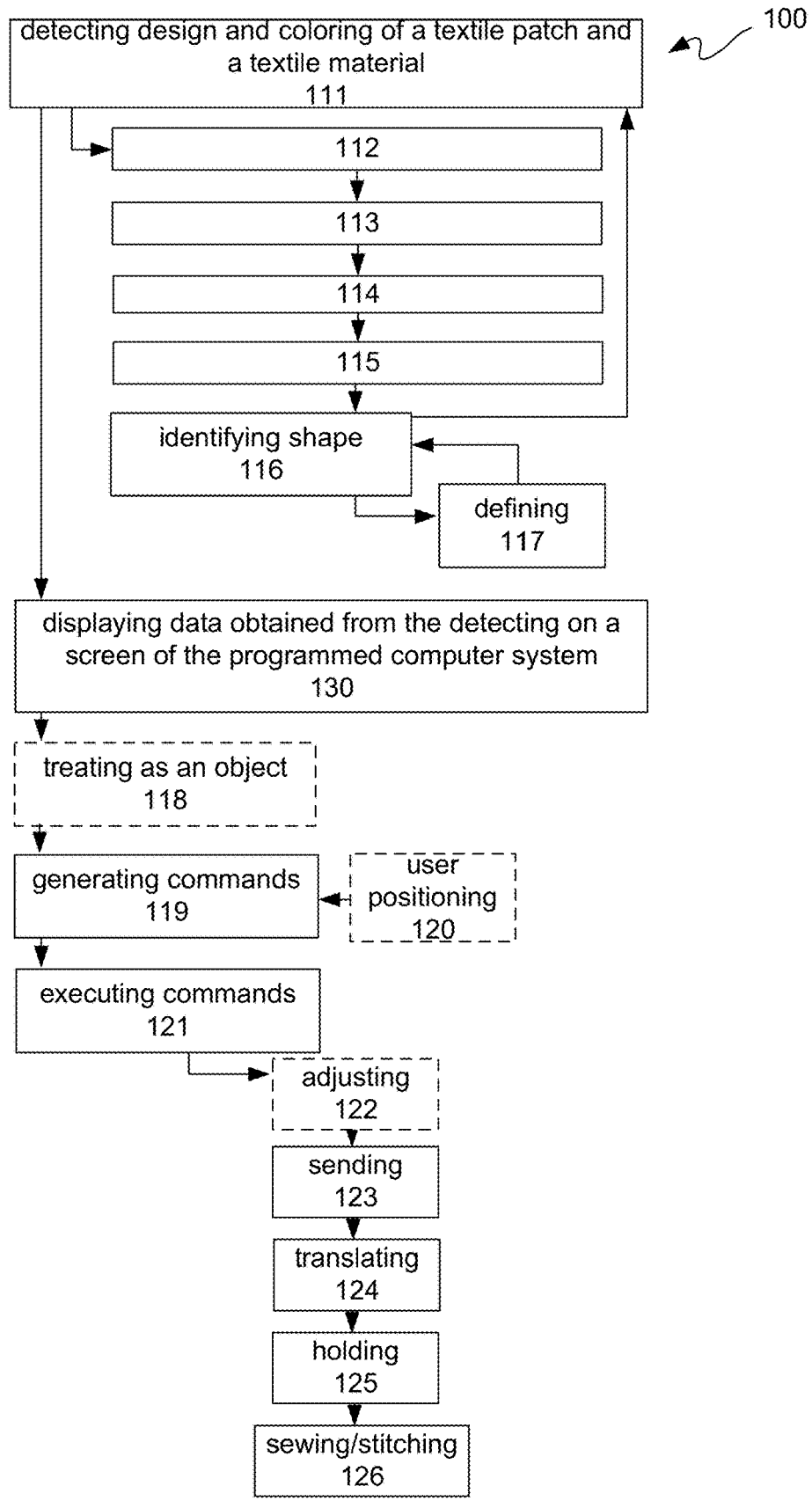
Figure 2:
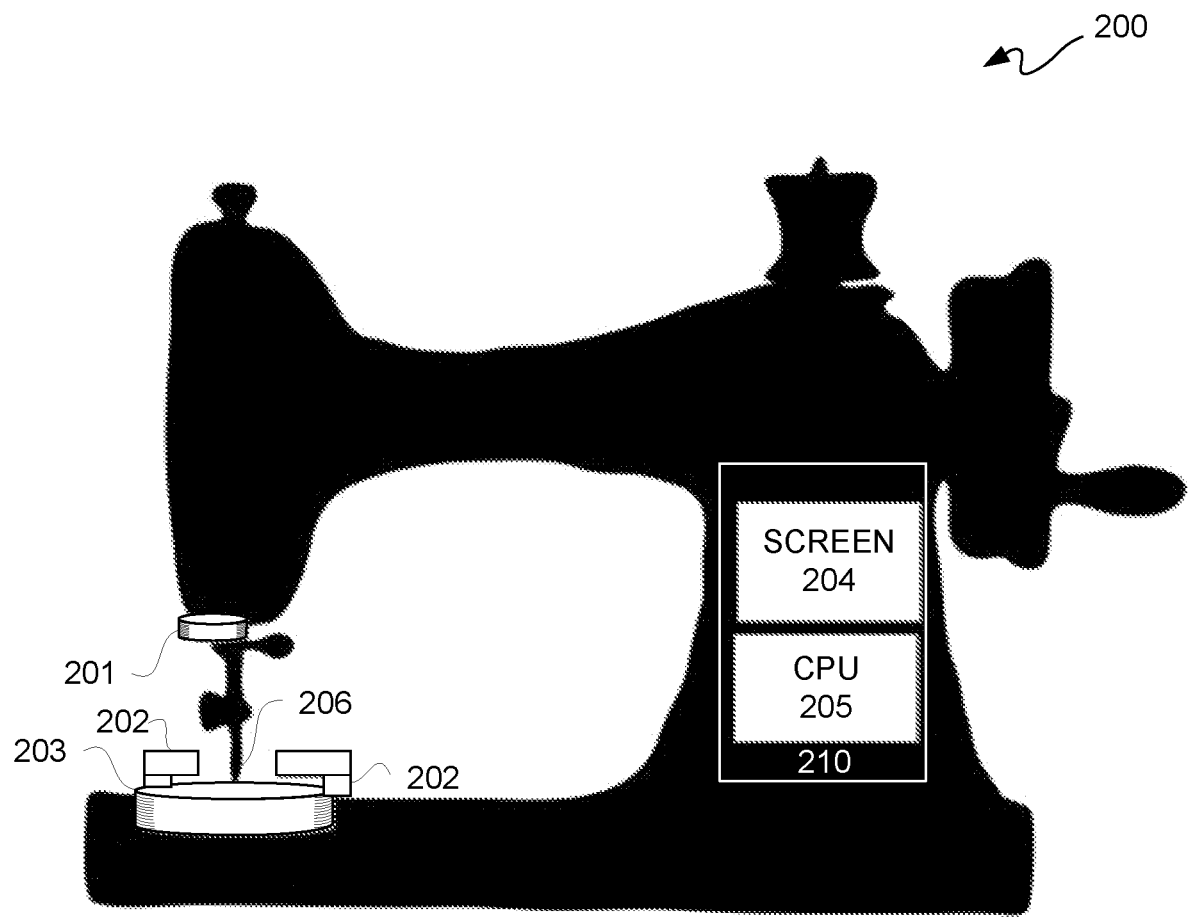
Figure 3:
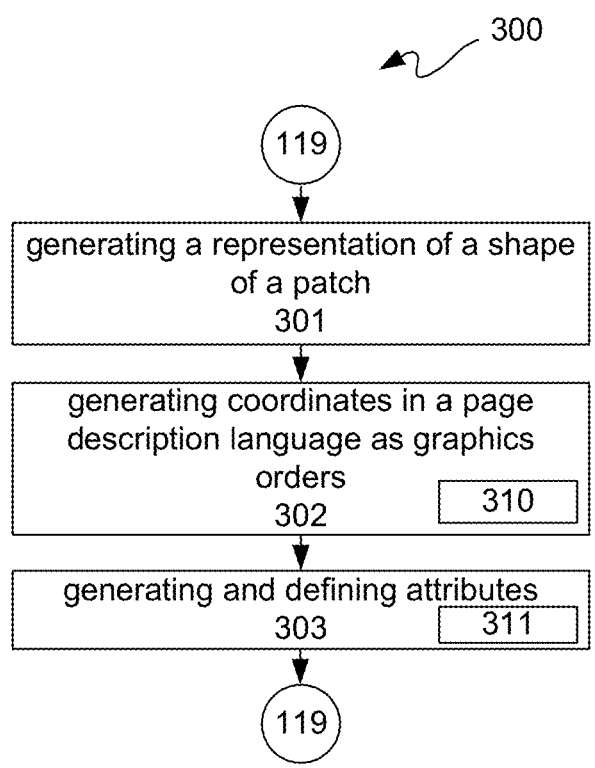

FIG. 1-3 is a flow diagram depicting the example of attachment flow 100 of FIG. 1-2 with additional operations, as described below in additional detail. Attachment flow 100 of FIG. 1-3 is further described with simultaneous reference to FIGS. 1-1 through 2.

From an operation of operations 112 through 115, detecting at operation 111 may further include identifying shape at operation 116 of a textile patch 105 delineated from pattern, if any, of textile material 110 from images thereof after image processing thereof by programmed computer system 210. At operation 117 of identification operation 116, such identifying operation may include defining an identified shape either as a geometric shape, including naming such geometric shape, or as an irregular shape.

In this example, it is assumed that textile material 110 is a woven fabric; however, in other examples, other types of materials for which a patch may be attached by stitching or sewing may be used.

Responsive to confirmation of displayed data at operation 130, commands for automated attachment of such a textile patch 105 to textile material 110 may be generated. Depending on coding, such a textile patch 105 at operation 118 may optionally be treated as an object to be sewn onto textile material 110. At operation 119, commands may be generated for attachment of such textile patch 105 to textile material 110 by sewing machine 200 under control of programmed computer system 210.

Generation of commands at operation 119 may include translating graphics orders in a page description language into such commands for operation of sewing machine 200 by way of image processing by programmed computer system 210. More particularly, graphic orders may be obtained from image processing of images by programmed computer 210.

FIG. 3 is a block diagram depicting an example of an image processing flow 300. Image processing flow 300 is further described with simultaneous reference to FIGS. 1-1 through 3.

At operation 301, such as from operation 119, image processing of images obtained by camera 201 for processing by programmed computer system 210 may include generating a representation of a shape of a textile patch 105, as identified at operation 116, for displaying of data at operation 130 for example. Such a representation 310 may include a list of coordinates for such textile patch 105, which may be relative to textile material 110 indexed to moveable plate 203.

At operation 302, image processing of images by programmed computer system 210 may include generating or translating coordinates of such textile patch in a page description language into graphics orders for executable commands. Optionally, at operation 120, user positioning may be used for input, and such user positioning input, which may include user interaction with textile patch 105 and/or textile material 110, may be used for generation of a portion of such coordinates.

At operation 303, image processing of images by programmed computer system 210 may include generating and defining attributes 311 for such shape in such page description language as part of such graphics orders, and thus part of such executable commands. Such attributes may include one or more edge shades of such shape for selection of one or more thread shades corresponding to and matching, or nearly matching, with such one or more edge shades.

Returning to FIG. 1-3, after image processing, operation 119 may use information obtained therefrom, such as representation 310 having a list of coordinates and attributes 311, for generation of executable commands.

At operation 122 of operation 121, executing commands may optionally include adjusting one or more grips 202 and/or moveable plate 203 of sewing machine 200. Such adjustment may be associated with coordination of movement with a needle 201 of such sewing machine under control of programmed computer system 210.

At operation 123, execution of commands may include send such commands and data for automated sewing or stitching by sewing machine 200. At operation 123, intermediate data may be translated into an executable format for sewing machine 200 to perform command using such intermediate data. At operation 125, grips may be commanded to hold onto textile material 110 and textile patch 105 together under control of programmed computer system 210. Along those lines, one or more grips 202 under control of programmed computer system 210 may be adjusted for blocking needle 206 during operation of sewing machine 200 or for retracting to allow access to needle 206 during idling of sewing machine 200. Further, at operation 125, textile material 110 may be held to textile patch 105 with another portion of grips 202 under control of programmed computer system 210 during operation of sewing machine 210.

At operation 126, executing commands by sewing machine 200 under control of programmed computer system 210 may include thread selection for automated sewing of textile patch 105 to textile material 110.

This automated affixing of patches on textile may be efficient and save time in the manufacturing of clothes and save time for hobbyists, organizations, or institutions producing significant number of clothing with custom patches. This may be used to avoid embroidery directly onto clothing. Clothes may be mass produced without such embroidery and embroidery designs may be created as and replaced by patches. An automated sewing machine as described herein can automatically sew embroidered patches onto clothing.

Generally, CPU 205 provides a computational engine for the detection of textile material 110 and its properties, for controlling grips 202 and moveable platform 203. CPU 205 receives images from camera 201 and stores such images in memory or persistent storage, such as for example as described in additional detail with reference to FIG. 6.

Program code executed by CPU 205 for image processing may determine background or backdrop color. For example, using a first image or first set of images, textile material 110 onto which textile patch 105 is to be affixed or sewn onto may be characterized as background. CPU 205 may then determine shape of such patch based on subsequent images from camera 201. Any shape that is detected that does not belong to an identified background or backdrop may be designated as a patch.

Optionally, an example preview may be shown to a user on display screen 204. A user can confirm position and can initiate automated sewing or stitching by pushing or selecting a user control in displayed on a touch-screen display screen 204 or using some other knobs or controls of sewing machine 200. Selection of automated sewing or stitching activates grips or robotic arms 202 to hold textile material 110 and patch 105 to be affixed in place. Once a user elects to start automated sewing or stitching, CPU 205 may send instructions, such as previously described commands, to sewing machine 200 to perform such automated sewing or stitching processing.

Again, instructions may be a set of commands, like digital instructions such as PDLs but in an engine-format or language, that are executable by sewing machine 200. Data may include coordinates that correspond to the shape of textile patch 105. Such data may include movements for moveable plate 203 for moving such plate relative to needle 206.

Such data may include the color of thread to pull. Such data may include the type of stitching or sewing pattern. A stitching or sewing pattern may be user-selectable or user-overridable through an option displayed on display screen 204.

For production, such sewing machines 200 may be networked and may be controlled wirelessly, such as be a mobile phone. Along those lines, a patch attachment as a service model may be implemented, where patches may be attached on demand to an article of clothing ordered online. Because one or more of the examples described herein may be implemented using an information processing system, a detailed description of examples of each of a network (such as for a Cloud-based SaaS implementation), a computing system, and a mobile device is provided. However, it should be understood that other configurations of one or more of these examples may benefit from the technology described herein.

Figure 4:
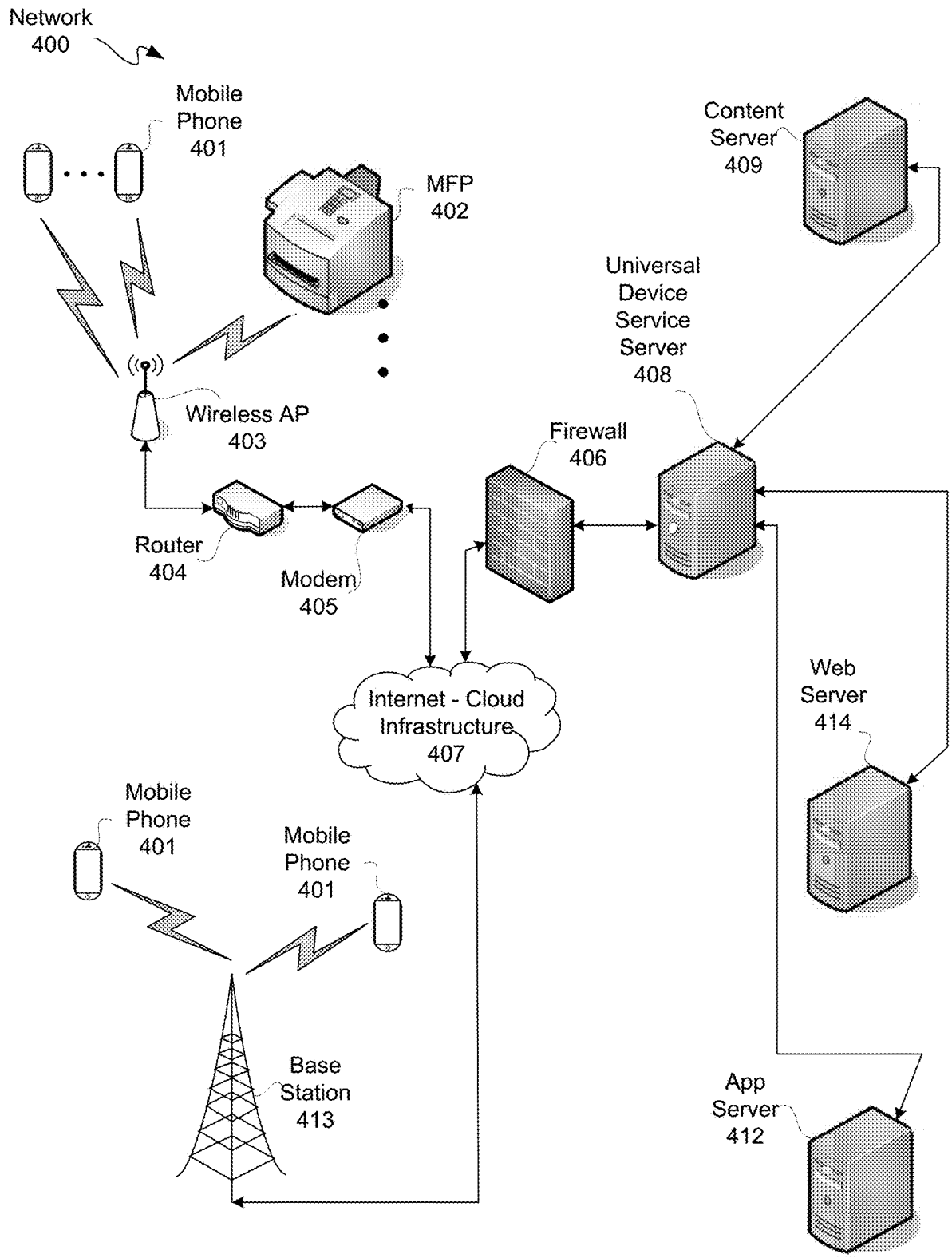
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
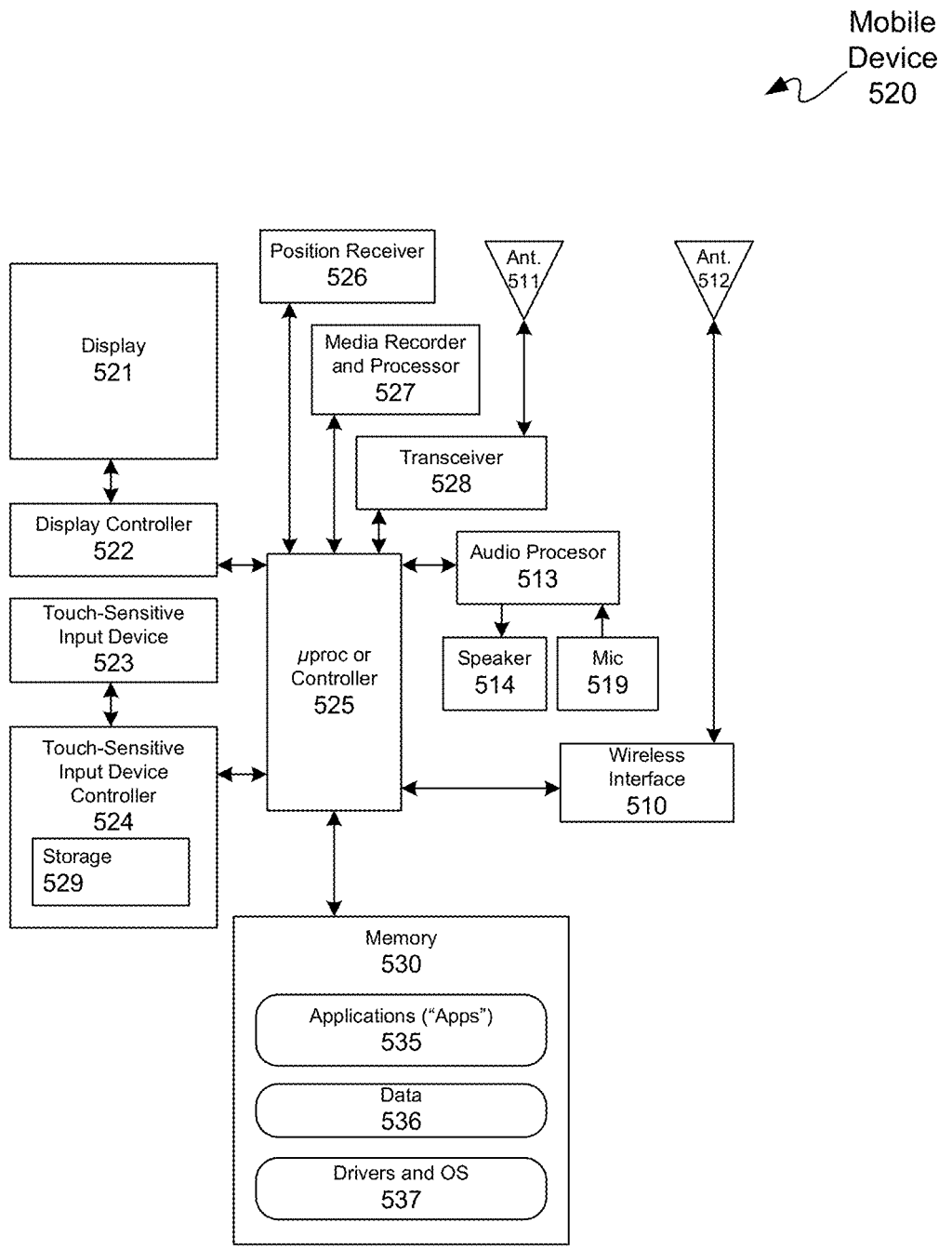
FIG. 5 is block diagram depicting an example of a portable communication device.

FIG. 5 is block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
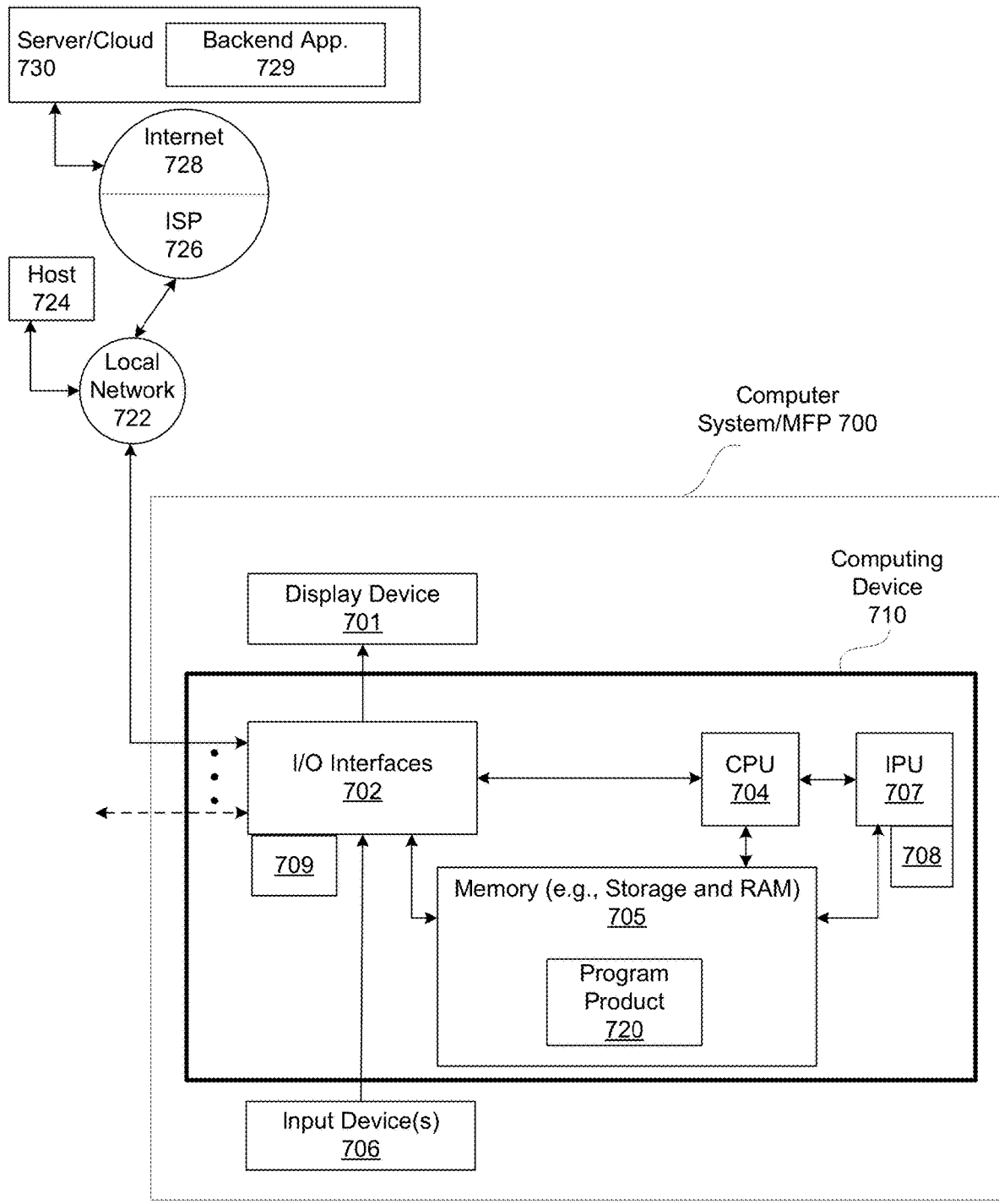
FIG. 6 is a block diagram depicting an example of a computer system.

FIG. 6 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for a textile patch attachment to textile material, comprising:
   detecting design and coloring of the textile patch and the textile material including:
      capturing images of the textile patch and the textile material with a camera;
      sending the images to a programmed computer system in communication with the camera for image processing;
      determining thickness and colors of the textile patch and the textile material from the image processing of the images;
      determining position of the textile patch relative to a pattern of the textile material from the image processing of the images;
      identifying a shape of the textile patch delineated from the pattern of the textile material from the images after the image processing thereof by the programmed computer system; and
   displaying data obtained from the detecting on a display screen of the programmed computer system; and
   wherein the image processing of the images comprises:
      generating a representation of the shape for the displaying of the data;
      wherein the representation includes a list of coordinates;
      generating the coordinates in a page description language as graphics orders;
      generating and defining attributes for the shape in the page description language as part of the graphics orders;
      wherein the attributes include one or more edge shades of the shape;
      selecting one or more thread shades corresponding to and matching with the one or more edge shades;
   responsive to the shape as identified, generating commands for automated attachment of the textile patch to the fabric by a sewing machine under control of the programmed computer system; and
   wherein the generating of the commands includes translating the graphics orders in the page description language into the commands for operation of the sewing machine under control of the programmed computer system.

2. The method according to claim 1, wherein the detecting further comprises:
   treating the textile patch as an object to be sewn onto the textile material.

3. The method according to claim 2, wherein the identifying comprises defining the shape as a geometric shape.

4. The method according to claim 2, wherein the identifying comprises defining the shape as an irregular shape.

5. The method according to claim 2, further comprising executing the commands for adjusting grips and moving a moveable plate of the sewing machine under control of the programmed computer system.

6. The method according to claim 5, further comprising sending the commands and the data for automated sewing or stitching by the sewing machine.

7. The method according to claim 6, further comprising translating intermediate data into an executable format for the sewing machine to perform sewing operations.

8. The method according to claim 7, further comprising commanding the grips to hold onto the textile material and the textile patch together under control of the programmed computer system.

9. A system, comprising:
   a programmed computer system having memory, a processor, a display, and in communication with a camera and a sewing machine;
   the processor coupled to the memory, wherein, in response to executing program code, the processor of the programmed computer system is configured to initiate operations for attachment of a textile patch to a textile material, the operations including:
   detecting design and color of the textile patch and the textile material including:
      capturing images of the textile patch and the textile material with the camera;
      sending the images to the programmed computer system in communication with the camera for image processing;
      determining thickness and colors of the textile patch and the textile material from the image processing of the images;
      determining position of the textile patch relative to a pattern of the textile material from the image processing of the images;
      identifying a shape of the textile patch delineated from the pattern of the textile material from the images after the image processing thereof by the programmed computer system; and displaying data obtained from the detecting on the display of the programmed computer system; and wherein the image processing of the images comprises:

generating a representation of the shape for the displaying of the data;

wherein the representation includes a list of coordinates;

generating the coordinates in a page description language as graphics orders;

generating and defining attributes for the shape in the page description language as part of the graphics orders;

wherein the attributes include one or more edge shades of the shape;

selecting one or more thread shades corresponding to and matching with the one or more edge shades;

responsive to the shape as identified, generating commands for automated attachment of the textile patch to the fabric by the sewing machine under control of the programmed computer system; and wherein the generating of the commands includes translating the graphics orders in the page description language into the commands for operation of the sewing machine under control of the programmed computer system.

\* \* \* \* \*